United States Patent [19]

Schatz

[11] Patent Number: 5,211,671

[45] Date of Patent: May 18, 1993

[54] METHOD OF CHARGING THE SALT SPACE OF A LATENT HEAT STORAGE MEANS

[76] Inventor: Oskar Schatz, Waldpromenade 16, D-8035 Gauting, Fed. Rep. of Germany

[21] Appl. No.: 825,824

[22] Filed: Jan. 24, 1992

Related U.S. Application Data

[63] Continuation of Ser. No. 634,786, Dec. 27, 1990, which is a continuation of Ser. No. 224,819, Jul. 27, 1988, abandoned.

[30] Foreign Application Priority Data

Jul. 29, 1987 [DE] Fed. Rep. of Germany ....... 3725161

[51] Int. Cl.$^5$ .............................................. B23P 15/26
[52] U.S. Cl. ................................... 29/890.03; 165/10
[58] Field of Search ........................ 165/10; 29/890.03

[56] References Cited

U.S. PATENT DOCUMENTS 3,062,510 11/1962 Percival ................................ 165/10

FOREIGN PATENT DOCUMENTS 35292 2/1982 Japan ..................................... 165/10
196596 10/1985 Japan ..................................... 165/10

*Primary Examiner*—Albert W. Davis, Jr.
*Attorney, Agent, or Firm*—Harness, Dickey & Pierce

[57] ABSTRACT

For charging the salt space of a latent heat storage means the salt is heated to a charging temperature. The temperature is so near the maximum temperature occurring during production and during operation of the heat storage means that any temperature difference present between the charging temperature and the maximum temperature will at the most only cause a negligible expansion in volume and consequent stressing of the wall of the salt space.

1 Claim, No Drawings

METHOD OF CHARGING THE SALT SPACE OF A LATENT HEAT STORAGE MEANS

This is a continuation of U.S. patent application Ser. No. 634,786, filed Dec. 27, 1990, which was a continuation of Ser. No. 224,819, filed Jul. 27, 1988 now abandoned.

BACKGROUND OF THE INVENTION

The invention relates to a method for charging the salt space of a latent heat storage means. During charging, the salt space is fully charged with salt heated above its fusing temperature. After charging, the salt space is hermetically sealed.

The storage of latent heat in fusing salt mixtures or even salt solutions is a known practice. It is also a known practice to produce latent heat storage means by charging rigid salt elements with salt in its liquid salt condition, just above the fusing temperature. Further, to avoid the inclusions of air, meticulous topping off is undertaken and the salt space is hermetically sealed. The temperatures occurring during operation are substantially higher than those used for charging.

In order to keep heat losses as low as possible, highly effective thermal insulation is needed for the storage core containing the salt elements. The housing containing the storage core is surrounded by an external housing forming an insulation space. A high vacuum is preferably produced in the insulation space. In order to maintain a permanent vacuum as long as possible, the surfaces facing the insulation space of the inner and of the outer housing and possibly the internal structures, have to be degassed In the insulation space. A baking operation whose temperature is also substantially greater than the fusing temperature is used to enhance the degassing of the insulation space.

The fusion or transition temperature in the case of conventional latent heat storage means is about 70° C. The salt elements are charged at a slightly higher temperature. The maximum operating temperature is at 125°, while a desired baking temperature is about 400°.

Both the temperature occurring during operation and occurring during baking may lead to a substantial pressure build-up in the salt space, especially if the boiling point of the salt-mixture is exceeded.

In order to tackle the problems in this connection the practice has been adopted of dividing up the salt volume into separate elements. The separate elements are in the form of flat, thin walled bodies in order to make possible changes in volume, which are caused in operation or in production. However this leads to the further disadvantage that it is awkward to charge a large number of separate elements. Also, economic topping off is not possible and in the case of assembly, at relatively low temperatures, one has to allow an expansion space between the individual salt elements and their supports.

SUMMARY OF THE INVENTION

One object of the invention is to overcome these shortcomings. The method provides as initially mentioned, simple charging and recharging of a single-piece, self-contained salt space which, in turn, provides simple and low cost production of the heat storage means.

DETAILED DESCRIPTION OF THE PREFERRED EMBODIMENT

In order to achieve this aim in the invention, the salt is charged into the salt space at a charging temperature which is so near the maximum temperature occurring during production and operation that any temperature difference between the charging temperature and the maximum temperature only produces at the most negligible expansion in volume and resulting mechanical stressing of the wall of the salt space.

If the expansion in volume and the resulting mechanical stressing of the wall of the salt space are to be completely eliminated, then in accordance with a convenient form of the invention, the charging temperature may be equal to the maximum temperature.

If for instance the salt carrying the latent heat consists of a sodium hydroxide solution in water with a fusion temperature of about 60° C. and a boiling point of about 200° C., the charging temperature would, in accordance with practice so far, be about 65° C. For the maximum charging temperature of 125° C. it would thus be necessary to allow for an increase in the volume of the salt corresponding to the increase in temperature from 65° C. to 125° C. Since it is desirable to have the baking temperature as high as possible, and the boiling point of this salt solution is 200° C., then in accordance with the invention, charging takes place at about 180° C. Thus charging at atmospheric pressure is possible and the baking temperature may also be set at 180° C.

After the baking salt mixture is cooled down to the operating temperature, which is accompanied by a corresponding reduction in the volume of the salt solution. Thus, the stress produced on the container walls is limited and under control owing to the maximum operation pressure of about 2.5 bar.

However on the other hand in selecting the charging temperature, plastic deformation of the salt space wall under the influence of a temperature increase, corresponding to the temperature difference, up to a maximum temperature limit to be selected must be taken into consideration. Thus, when the maximum temperature is reached for the first time, the plastic deformation takes place as a once-only event and does not impair the strength of the wall of the salt space.

Owing to the use of the method in accordance with the invention, it is possible to provide a single salt space suitable for receiving the salt charge. The space may be charged and recharged through a single charging opening. The opening contributes to a substantial lowering of manufacturing time and costs. Thus it is possible to provide the salt space with a rigid wall which is thus particularly easy to assemble and fit.

A further advantage of the method is provided by substantially raising the baking temperature and thus drastically shortening the time of reduction.

While the above detailed description describes the preferred embodiment of the present invention, the invention is susceptible to modification, variation, and alteration without deviating from the scope and fair meaning of the subjoined claims.

I claim:

1. A method for charging the salt space of a latent heat storage means, in the case of which the salt space is fully charged with salt heated to above its fusing temperature and then the salt space is hermetically sealed, the method comprising the steps of charging the salt into the salt space at a charging temperature which is substantially equal to a maximum temperature occurring during production and operation such that during operation at a maximum operation pressure substantially greater than atmospheric pressure, expansion in volume and resulting mechanical stressing of the wall of the salt space are substantially eliminated during any temperature differences between the charging temperature and maximum temperature and plastically deforming said wall at said maximum temperature such that wall strength is not impaired during operation.

* * * * *